United States Patent
Hill

(10) Patent No.: US 10,584,062 B2
(45) Date of Patent: Mar. 10, 2020

(54) USE OF SACRIFICIAL AGENTS IN MANUFACTURE OF GYPSUM WALLBOARD

(71) Applicant: Boral IP Holdings (Australia) Pty Limited, Roswell, GA (US)

(72) Inventor: Russell L. Hill, San Antonio, TX (US)

(73) Assignee: Boral IP Holdings (Australia) Pty Limited, North Sydney (AU)

(*) Notice: Subject to any disclaimer, the term of this patent is extended or adjusted under 35 U.S.C. 154(b) by 395 days.

(21) Appl. No.: 15/328,719

(22) PCT Filed: Aug. 5, 2014

(86) PCT No.: PCT/US2014/049733
§ 371 (c)(1),
(2) Date: Jan. 24, 2017

(87) PCT Pub. No.: WO2016/022102
PCT Pub. Date: Feb. 11, 2016

(65) Prior Publication Data
US 2017/0210671 A1 Jul. 27, 2017

(51) Int. Cl.
| | | |
|---|---|---|
| *C04B 28/14* | (2006.01) | |
| *B29C 44/12* | (2006.01) | |
| *E04B 1/94* | (2006.01) | |
| *E04B 2/72* | (2006.01) | |
| *C04B 111/00* | (2006.01) | |
| *C04B 111/10* | (2006.01) | |
| *B29K 79/00* | (2006.01) | |
| *B29K 105/04* | (2006.01) | |
| *B29K 105/20* | (2006.01) | |
| *B29L 31/00* | (2006.01) | |

(52) U.S. Cl.
CPC .......... *C04B 28/14* (2013.01); *B29C 44/1228* (2013.01); *E04B 1/942* (2013.01); *E04B 2/723* (2013.01); *B29K 2079/00* (2013.01); *B29K 2105/04* (2013.01); *B29K 2105/20* (2013.01); *B29L 2031/776* (2013.01); *C04B 2111/0062* (2013.01); *C04B 2111/1006* (2013.01); *Y02W 30/92* (2015.05); *Y02W 30/97* (2015.05)

(58) Field of Classification Search
CPC ............ C04B 28/14; C04B 2111/0062; C04B 2111/1006; B29C 44/1228; B29K 2079/00; B29K 2105/04; B29K 2105/20; B29L 2031/776; E04B 1/942; E04B 2/723
See application file for complete search history.

(56) References Cited

U.S. PATENT DOCUMENTS

| | | | | |
|---|---|---|---|---|
| 2,320,010 A | * | 5/1943 | Ralston | C04B 24/12 106/781 |
| 2,776,222 A | * | 1/1957 | Foss | C09C 1/025 106/471 |
| 5,151,130 A | | 9/1992 | Croft et al. | |
| 7,393,424 B2 | * | 7/2008 | Schwartz | C04B 24/2647 106/772 |
| 7,485,184 B2 | | 2/2009 | Hill et al. | |
| 7,572,329 B2 | | 8/2009 | Liu et al. | |
| 7,892,349 B2 | | 2/2011 | Hill et al. | |
| 7,892,350 B2 | | 2/2011 | Hill et al. | |
| 8,142,856 B2 | * | 3/2012 | Chevalier | C04B 20/1051 264/134 |
| 2004/0187741 A1 | * | 9/2004 | Liu | C04B 28/145 106/785 |
| 2006/0278129 A1 | | 12/2006 | Liu et al. | |
| 2008/0000392 A1 | * | 1/2008 | Blackburn | C04B 24/165 106/672 |
| 2008/0017078 A1 | * | 1/2008 | Bichler | C04B 28/14 106/717 |
| 2009/0169864 A1 | * | 7/2009 | Wang | C04B 24/16 428/319.1 |
| 2009/0199742 A1 | | 8/2009 | Hill et al. | |
| 2009/0199743 A1 | | 8/2009 | Hill et al. | |
| 2009/0258773 A1 | | 10/2009 | Shine | |
| 2010/0286312 A1 | | 11/2010 | Zhang et al. | |
| 2011/0213043 A1 | | 9/2011 | Blackburn et al. | |
| 2012/0085264 A1 | | 4/2012 | Zhang et al. | |
| 2013/0206040 A1 | | 8/2013 | Zhang et al. | |
| 2013/0330532 A1 | | 12/2013 | Dierschke et al. | |
| 2015/0376063 A1 | * | 12/2015 | Francis | C04B 28/147 428/532 |
| 2016/0135465 A1 | * | 5/2016 | Polson | A01N 55/02 428/328 |
| 2016/0229748 A1 | * | 8/2016 | Gehrig | C04B 28/14 |

FOREIGN PATENT DOCUMENTS

WO WO-2010133886 A1 * 11/2010 ......... C04B 24/2652

OTHER PUBLICATIONS

International Search Report for PCT/US2014/049733 (dated Apr. 28, 2015).

* cited by examiner

*Primary Examiner* — Anthony J Green
(74) *Attorney, Agent, or Firm* — Bookoff McAndrews, PLLC

(57) ABSTRACT

The present invention relates to the use of sacrificial agents to counteract the deleterious impact of gypsum contaminants on the effectiveness of certain stucco additives, particularly, water reducing agents and foaming agents, in a stucco slurry used to make gypsum wallboard.

25 Claims, No Drawings

USE OF SACRIFICIAL AGENTS IN MANUFACTURE OF GYPSUM WALLBOARD

BACKGROUND

Aspects of this disclosure relate to the preparation of a stucco slurry useful in the manufacture of gypsum wallboard. In particular, one or more aspects of the disclosure generally relate to the use of sacrificial agents to reduce the disruptive effect of certain contaminants in a stucco slurry used in the production of gypsum wallboard and to the resulting wallboard product.

Gypsum wallboard (also known as drywall, plasterboard, sheetrock, or gypsum board) is commonly used as a construction material. Gypsum wallboard is widely used in building constructions primarily as interior walls and ceilings. Based on the type of construction being performed it may be desirable for the gypsum wallboard to exhibit certain performance properties, including being light weight with structural stability, as well as having reduced sound transmission, thermal resistance, impact resistance, fire resistance, mold and/or mildew resistance, sag resistance, and/or the like. Although it is desirable to have gypsum wallboard exhibit all or some of these properties, it is additionally desirable that the production cost of producing gypsum wallboard with such improved properties not be increased to any significant extent, as gypsum wallboard is commonly viewed as a commodity product.

Gypsum wallboard is commercially produced by depositing an aqueous slurry of stucco (also known as calcined gypsum and chemically identified as calcium sulfate hemihydrate), to form a core layer between two cover sheets, allowing the slurry to set (harden) and then drying the resultant product. Water is added to the stucco in an amount sufficient to hydrate the calcined gypsum and to produce a fluid slurry. Any water added beyond the amount required to re-hydrate the stucco, however, eventually must be removed from the slurry as the board is manufactured. The need to remove this excess water during wallboard production accordingly increases energy costs. In addition, board strength also is known to be inversely proportional to the amount of water used in manufacturing the wallboard. Thus, there is an incentive to reducing the amount of water used when preparing the stucco slurry.

Historically, dispersants or water reducers have been used as a stucco slurry additive as a way of minimizing the amount of excess water necessary for producing a desired amount of fluidity in the stucco slurry. Exemplary stucco dispersants (water-reducing agents) include, but are not limited to, lignosulfonates, polycarboxylates, naphthalene sulfonates, and combinations thereof. These and other dispersants enhance the fluidity of the stucco slurry by reducing the slurry viscosity. As a result of the reduced water demand obtained through the use of these dispersants, overall process control is improved and energy costs are limited. The improved slurry fluidity also promotes increased penetration of the cover sheets (e.g., enhances cover (paper face) penetration) by the stucco slurry resulting in a more structurally stable wallboard product. Still other additives, like foam (soap) may also be added to the stucco slurry to obtain/ improve other wallboard properties.

Gypsum used in the manufacture of wallboard is obtained primarily from mining natural gypsum and from gypsum obtained by desulfurization of flue gas from a coal-fired or lignite-fired power plant (this synthetic gypsum is also called desulfogypsum (DSG) or flue gas desulfurization (FGD) gypsum). Regardless of the gypsum source, the gypsum that is calcined and used to prepare the raw stucco may contain a variety of contaminants. Such contaminants may include clays (common to mined gypsum) and fly ash (common to desulfogypsum). At least some of the contaminants present in the gypsum that is calcined to form stucco typically find their way into the stucco slurry. Such contaminants tend to interfere with the effectiveness of many of the commonly used additives included in the stucco slurry, particularly those additives used in small amounts, such as dispersants (water reducers) used to enhance the fluidity of the stucco slurry and foaming agents (soap) used to introduce voids into the set gypsum core for reducing the weight of individual boards.

In accordance with the present invention, to more efficiently manufacture gypsum wallboard certain sacrificial agents may be added to the stucco slurry to interfere with the action of these common stucco contaminants.

SUMMARY

The following presents a simplified summary in order to provide a basic understanding of some aspects of the disclosure. The summary is not an extensive overview of the invention disclosure. This summary is neither intended to identify key or critical elements of the disclosure, nor to delineate the scope of the disclosure. The following summary presents some concepts of the disclosure in a simplified form as a prelude to the more detailed description below.

Aspects of the disclosure provide effective, efficient, and convenient ways of manufacturing wallboard. In particular, certain aspects of the disclosure provide techniques for minimizing the disruptive effects of gypsum contaminants, such as clays and fly ash carbon, that ultimately may be encountered in a stucco slurry. By reducing the impact of these contaminants on certain common additives used in the preparation of a stucco slurry, the present invention provides a more efficient gypsum wallboard manufacturing process and helps to limit the costs of wallboard production. For convenience, the stucco (calcined gypsum) slurry may also be referred to throughout the specification and claims simply as a gypsum slurry.

In particular, the present invention involves the use of sacrificial agents as an additive for a stucco slurry used in combination with various, conventional additives (e.g., dispersants and/or foaming agents (soap)), in order to disrupt the impact that some common gypsum contaminants, which when present in the stucco slurry, might have on the performance of these conventional additives. By disrupting the impact of such gypsum contaminants, the present invention allows the conventional additives to function in a more effective and efficient manner. Such disruption thus leads to more efficient gypsum wallboard manufacturing processes. By encouraging more efficient gypsum wallboard manufacturing processes, the invention helps to reduce the overall costs required to manufacture gypsum wallboard.

The amount of any sacrificial agent used in a stucco slurry to counteract the disruptive effect of these gypsum contaminants on the effectiveness of additives such as dispersants (water reducing agents) and/or foaming agents should usually exceed the amount needed to completely neutralize the impact of such gypsum contaminants.

For example, certain aspects of the disclosure include preparing a calcined gypsum (stucco) slurry by adding a sacrificial agent to the slurry. Subsequently, to prepare a gypsum wallboard, the stucco slurry may be deposited onto a first cover sheet and dispersed to cover the first cover sheet.

The combination of the first cover sheet and the stucco slurry may then be set and dried to yield a wallboard. In another aspect, a second cover sheet may be deposited over the stucco slurry layer, to sandwich the slurry between the two cover sheets, before setting of the stucco and drying the combination of the first and second cover sheets and the set stucco slurry layer.

In yet another aspect of the disclosure, dry stucco may be compounded (e.g., treated such as by thorough mixing) with a sacrificial agent or a combination of sacrificial agents before the dry stucco is used to prepare a stucco slurry. Following preparation of the stucco slurry, the steps for manufacturing a gypsum wallboard are the same as above.

In one embodiment, the sacrificial agent can be an aromatic organic compound bearing one or more sulfonate, or amino groups, and combinations of such groups, or it may be a glycol or glycol derivate having a molecular weight of about 2000 daltons or less, and any combination thereof, but it is is not polyethylene glycol.

In more specific embodiments, the sacrificial agent may be a compound selected from alcohols, diols, polyols, ethers, esters, aromatic sulfonates, amines, alcohol amines, amides, ammonium salts, and polyglycols, particularly those for which Log $K_{ow}$ is in the range of −3 to +2 (more preferably −2 to +2), and/or the HLB value of the sacrificial agent is in the range of 5 to +20.

In some embodiments, the sacrificial agent is a primary amine, secondary amine, or tertiary amine compound, or any combination thereof. For example, the sacrificial agent can be a compound selected from the group consisting of the structure NR1R2R3

where R1 is a substituted or unsubstituted non-alkoxylated $C_{5-22}$ alkyl, a substituted or unsubstituted non-alkoxylated $C_{5-22}$ alkenyl, a substituted or unsubstituted non-alkoxylated $C_{5-22}$ alkynyl, a substituted or unsubstituted $C_{2-22}$ (including $C_{5-22}$) alkoxylated alkyl, a substituted or unsubstituted $C_{2-22}$ (including $C_{5-22}$) alkoxylated alkenyl, or a substituted or unsubstituted $C_{2-22}$ (including $C_{5-22}$) alkoxylated alkynyl. R2 and R3 are each independently selected from hydrogen, a substituted or unsubstituted $C_{1-22}$ alkyl, a substituted or unsubstituted $C_{2-22}$ alkenyl, or a substituted or unsubstituted $C_{2-22}$ alkynyl. R2 and R3 can optionally be alkoxylated. In particular, one or more of R1, R2, or R3 can be an alkoxylated or non-alkoxylated, substituted or unsubstituted, fatty acid residue. The fatty acid residues can be saturated fatty acid residues, monounsaturated fatty acid residues, polyunsaturated fatty acid residues, or mixtures thereof. In some embodiments, one or more of R1, R2, and R3 can also be amino-substituted including having NR4R5 as a substituent, where R4 and R5 can be one of the moieties suitable as R2 or R3.

In other embodiments discussed below, the sacrificial agent may be selected from an alcohol ethoxylate (e.g., poly(oxy-1,2-ethanediyl), α-(2-ethylhexyl)-ω-hydroxy).

In other aspects of the invention, one or more additional additives (e.g., starches, accelerators, fibers (such as paper and/or glass fibers), polymers, potash, boric acid, plasticizers, fire retarders, mildew retarders, thickeners, other dispersants, coalescing agent, foams, and the like) also may be added to the stucco slurry.

In certain embodiments of the disclosure, a stucco slurry may be formed including stucco (calcined gypsum), water, and the sacrificial agent. A dispersant and/or foaming agent is also added to the gypsum slurry.

The term "sacrificial agent" refers to a compound, or a mixture of compounds, that interacts with (i.e., neutralizes the detrimental effects of) contaminants in a calcined gypsum that would otherwise interfere with the proper functioning of a dispersing agent and/or foaming agent and thus reduce their effectiveness in a stucco slurry. The sacrificial agents do not themselves function as a dispersing agent and/or foaming agent.

The term "substituted" as used herein indicates the main moiety has attached to it one or more additional substituents, such as, for example, amino, hydroxyl, carbonyl, or halogen groups. The term "unsubstituted" indicates that the main substituent has a full complement of hydrogens, commensurate with its saturation level (i.e., there are no substitutions).

The terms "alkyl", "alkenyl", and "alkynyl" as used herein include both straight-chain and branched monovalent hydrocarbon substituents. Examples include methyl, ethyl, isobutyl, 2-propenyl, 3-butynyl, and the like.

These features, along with many others, are discussed in greater detail below.

DETAILED DESCRIPTION

Various examples and embodiments of the inventive subject matter disclosed here are possible and will be apparent to the person of ordinary skill in the art, given the benefit of this disclosure. In this disclosure reference to "certain exemplary embodiments" (and similar phrases) means that those embodiments are merely non-limiting examples of the inventive subject matter and that there likely are other alternative embodiments which are not excluded. Unless otherwise indicated or unless otherwise clear from the context in which it is described, alternative elements or features in the embodiments and examples below and in the Summary above are interchangeable with each other. That is, an element described in one example may be interchanged or substituted for one or more corresponding elements described in another example. Similarly, optional or non-essential features disclosed in connection with a particular embodiment or example should be understood to be disclosed for use in any other embodiment of the disclosed subject matter. More generally, the elements of the examples should be understood to be disclosed generally for use with other aspects and examples of the products and methods disclosed herein. A reference to a component or ingredient being operative, i.e., able to perform one or more functions, tasks and/or operations or the like, is intended to mean that it can perform the expressly recited function(s), task(s) and/or operation(s) in at least certain embodiments, and may well be operative to perform also one or more other functions, tasks and/or operations.

While this disclosure includes specific embodiments, including presently preferred embodiments, those skilled in the art will appreciate that there are numerous variations and modifications within the spirit and scope of the invention as set forth in the appended claims. Each word and phrase used in the claims is intended to include all its dictionary meanings consistent with its usage in this disclosure and/or with its technical and industry usage in any relevant technology area. Indefinite articles, such as "a," and "an" and the definite article "the" and other such words and phrases are used in the claims in the usual and traditional way in patents, to mean "at least one" or "one or more." The word "comprising" is used in the claims to have its traditional, open-ended meaning, that is, to mean that the product or process defined by the claim may optionally also have additional features, elements, etc. beyond those expressly recited.

Gypsum wallboard is a construction material that may be manufactured as panels having a gypsum core sandwiched between two substantially parallel cover sheets. Usually, the cover sheets are made of paper as in conventional gypsum wallboard, although other cover sheet materials known in the art (e.g. coated or uncoated fibrous glass mats) also may be used as one or both of the cover sheets. When used, the fibrous mats will usually be nonwoven glass fiber mats in which filaments of glass fiber are bonded together by an adhesive and often the nonwoven glass fiber mats will have a resin-based coating. Such cover sheets are well-known to those skilled in the gypsum wallboard art.

The gypsum core of the wallboard is formed of re-hydrated (set) calcinated gypsum (e.g., rehydrated calcium sulfate hemihydrate, or stucco). Stucco used to produce the gypsum core is typically formed in the production of wallboard utilizing mined, natural gypsum and/or synthetic fluidized desulfurization sludge (FGD) gypsum. Such sources of gypsum may contain certain contaminants and/or impurities, which have a negative impact on performance of various additives usually included in the stucco slurry.

For example, natural gypsum may contain clay contaminants, such as smectite, illite, kaolin or chlorite clays. Such alumino-silicate based contaminants have a high surface area, as well as possessing surface charges, such that the contaminants exhibit a high adsorption capacity for various surfactant and dispersant chemistries generally used to advantage in the production of gypsum wallboard. For example, a polycarboxylate-type water reducing agent or dispersant can be readily adsorbed by clay contaminants present in a stucco slurry. The adsorption of such additives, which are usually used in relatively small amounts, effectively reduces the concentration of available dispersant or other additive otherwise present to act as a dispersant for stucco particles, or to function for some other purpose in the stucco slurry. Therefore, the dispersant's effectiveness as a water reducer is limited when in the presence of clays. Clay contaminates may also adsorb other stucco slurry additives, particularly surfactants or soaps (e.g., foaming agents), such as alky and alkyl ether sulfate compounds. Once adsorbed onto the clay contaminants these materials become unavailable to carry out their intended function of entraining air or maintaining a stable foam in the stucco slurry. Additionally, FGD gypsum likely contains some amount of residual fly ash and related carbon contaminants. For example, fly ash carbon, in particular, has properties akin to an activated carbon and thus likely has a high affinity for chemical dispersants and surfactants. The presence of residual fly ash and carbon contaminants thus also adversely impacts the ability of a dispersant, or other additive present in very small amounts such as a soap, to efficiently reduce water demand and adversely impacts the ability of a surfactant to entrain air or maintain stable foam.

In the manufacture of gypsum wallboard, water is added to stucco to form a slurry, which slurry is deposited on a first cover sheet as the wallboard is produced. In the usual wallboard production process, a second cover sheet then is placed on the stucco slurry to form a sandwich construction. The stucco slurry may be compressed to form a panel of a desired thickness, the slurry is allowed to set (harden) and the set wallboard is then dried. In some embodiments according to the present invention, a sacrificial agent may be added to the stucco slurry. In other embodiments, a sacrificial agent may be added to the dry stucco before a stucco slurry is prepared. The sacrificial agent is added to the stucco to mitigate against the negative impact that contaminants (e.g., clays, fly ash carbon, and the like) present in a calcined gypsum may have on other additives used to prepare the stucco slurry (e.g., dispersants (water reducing agents), foaming agents, and the like). In accordance with the present invention, sacrificial agents are chemicals, that when added to stucco, have a minimal impact on the normal hydration reaction of the stucco to form gypsum, but are strongly attracted to charged particles, e.g., clay or organic particles such as carbon, that contaminate gypsum sources and might otherwise act as adsorbents to reduce the desired effect of several stucco slurry additives.

Sacrificial agents may be represented by relatively small molecules that are generally classified as hydrotropes with a suitable value of hydrolphilic-lipophilic balance (HLB) such that they are moderately soluble in a stucco slurry, mobile and highly attracted to the expected gypsum contaminants and possess moieties that have an affinity for the gypsum contaminants. In some embodiments, the HLB value of the sacrificial agent or combination of sacrificial agents is in the range of 5 to 20. In accordance with the present invention, moieties of a particular sacrificial agent can be selected to optimize its affinity for clay, fly ash carbon, or other stucco contaminants. For example, when clay contaminates are present in a stucco, a sacrificial agent may be added that reduces the impact of the clay on surfactant or dispersant performance.

As noted above, the sacrificial agent can be an aromatic organic compound bearing one or more sulfonate, or amino groups, and combinations of such groups, a glycol or glycol derivate having a molecular weight of about 2000 daltons or less, and any combination thereof (but not polyethylene glycol). Examples of possible sacrificial agents are benzylamine, sodium 1-naphthoate, sodium 2-naphthalene sulfonate, sodium di-isopropyl naphthalene sulfonate, sodium cumene sulfonate, sodium di-butyl naphthalene sulfonate, ethylene glycol phenyl ether, ethylene glycol methyl ether, butoxyethanol, di-ethylene glycol butyl ether, di-propylene glycol methyl ether, polyethylene glycol and 1-phenyl 2-propylene glycol or a combination thereof. A combination of ethylene glycol phenyl ether and sodium di-isopropyl naphthalene sulfonate is another possible sacrificial agent wherein the relative proportion of the ethylene glycol phenyl ether and the sodium di-isopropyl naphthalene sulfonate may vary in weight ratio from 1:5 to 50:1, and preferably in the range of about 1:1 to 20:1.

For example, the sacrificial agent may be a member of a class of organic chemicals selected from the group consisting of alcohols, diols, polyols, ethers, esters, aromatic sulfonates, amines, alcoholamines, amides, ammonium salts, polyglycols, and mixtures thereof, but not a polyethylene glycol. For example, the sacrificial agent may be an alcohol selected from the group consisting of n-propanol, i-propanol, 1-butanol, 2-butanol, tertiary butanol, 1-pentanol, 3-pentanol, neopentanol, hexanol, benzyl alcohol phenyl-ethyl alcohol, and mixtures thereof. Alternatively, the sacrificial agent may be an ether selected from ethylene glycol methyl ether, ethylene glycol ethyl ether, ethylene glycol n-propyl ether, ethylene glycol n-butyl ether, ethylene glycol iso-butyl ether, ethylene glycol phenyl ether, propylene glycol phenyl ether, di-propylene glycol mono methyl ether, di-ethylene glycol butyl ether, ethylene glycol di-methyl ether, tri-ethylene glycol, tri-propylene glycol, polypropylene glycol 425 and P(EG-ran-propylene-glycol) 2500, p-dimethoxybenzene, and mixtures thereof. In another embodiment, the sacrificial agent may be an ester selected from the group consisting of methyloctanoate, methyllaurate, methylpalmitate, methyloleate, ethylene glycol mono-ethyl ether acetate, ethylpropionate, ethylbutyrate, ethylcaproate, POE (20) sorbitan monolaurate, and mixtures thereof. In still other embodiments, the sacrificial agent may be hexanoic acid, may be an aromatic sulfonate selected from the group consisting of 4-ethyl benzene sulfonic acid, 2-naphthalenesulfonate Na, p-toluene sulfonic acid, methyl naphthalene sulfonate, and mixtures thereof, may be an amine selected from the group consisting of triethylamine, n-butyl amine, aniline, benzyl amine, and mixtures thereof, may be an alcoholamine selected from the group consisting of 2-(2-aminoethoxy)ethanol, di-isopropanolamine, tri-isopropanolamine, and mixtures thereof, may be an amide selected from the group consisting of urea, dimethlyurea, n-butyl urea, and mixtures thereof, may be an ammonium salt selected from the group consisting of tetrapropyl ammonium hydroxide, tetrabutyl ammonium chloride, and mixtures thereof, may be a polyglycol selected from the group consisting of tri-ethylene glycol, tri-propylene glycol, polypropylene glycol 425, P(EG-ran-propylene-glycol) 2500, and mixtures thereof, or may be selected from the group consisting of 2-butanone, methylisobutylketone, butyraldehyde, 1-ethyl-2-pyrrolidinone, N-vinyl-2-pyrrolidinone, and mixtures thereof.

In accordance with the present invention, the sacrificial agent also may be a nonionic hydrotrope such as an alcohol ethoxylate (e.g., poly(oxy-1,2-ethanediyl), α-(2-ethylhexyl)-ω-hydroxy (CAS 26468-86-0

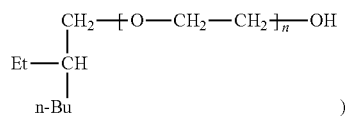

having on average 2 to 16 ethylene glycol repeats (i.e., n typically is in the range of 2 to 16 and often in the range of 2 to 6). One suitable source for these types of materials is AkzoNobel, which sells some low-foaming surfactants, e.g., $C_{8-10}$ alcohol ethoxylates having on-average 3-6 ethylene glycol repeats, under the Berol and Ethylan marks.

The sacrificial agent may also be a primary, secondary, or tertiary amine, or any combination thereof. For example, the sacrificial agent can be a compound selected from the group consisting of the structure NR1R2R3

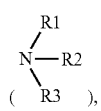

where R1 is a substituted or unsubstituted non-alkoxylated $C_{5-22}$ alkyl, a substituted or unsubstituted non-alkoxylated $C_{5-22}$ alkenyl, a substituted or unsubstituted non-alkoxylated $C_{5-22}$ alkynyl, a substituted or unsubstituted $C_{2-22}$ (including $C_{5-22}$) alkoxylated alkyl, a substituted or unsubstituted $C_{2-22}$ (including $C_{5-22}$) alkoxylated alkenyl, or a substituted or unsubstituted $C_{2-22}$ (including $C_{5-22}$) alkoxylated alkynyl. R2 and R3 are each independently selected from hydrogen, a substituted or unsubstituted $C_{1-22}$ alkyl, a substituted or unsubstituted $C_{2-22}$ alkenyl, or a substituted or unsubstituted $C_{2-22}$ alkynyl. R2 and R3 can optionally be alkoxylated. In particular, one or more of R1, R2, or R3 can be an alkoxylated or non-alkoxylated, substituted or unsubstituted, fatty acid residue. The fatty acid residues can be saturated fatty acid residues, monounsaturated fatty acid residues, polyunsaturated fatty acid residues, or mixtures thereof. In some embodiments, one or more of R1, R2, and R3 can also be amino-substituted including having NR4R5 as a substituent, where R4 and R5 can be one of the moieties suitable as R2 or R3.

For example, the sacrificial agent can be polyoxypropylenediamine or triethyleneglycol diamine. In some embodiments, the sacrificial agent is an alcohol amine.

In some embodiments, the sacrificial agent is a mixture of two or more of the above-identified compounds. In some embodiments, the HLB value of the sacrificial agent or the mixture of sacrificial agents is in the range of 5 to 20 (e.g., 4 to 18). In some embodiments, the Log $K_{ow}$ for the sacrificial agent can be in the range of −3 to +2 (e.g. −2 to +2).

In some embodiments, the sacrificial agent is a compound selected from tridodecylamine, dodecyldimethylamine, octadecyldimethylamine, cocoalkyldimethylamine, hydrogenated tallowalkyldimethylamines, oleyldimethylamine, dicocoalkylmethylamine, N-oleyl-1,1'-iminobis-2-propanol, N-tallowalkyl-1,1'-iminobis-2-propanol, polyoxypropylenediamine, triethyleneglycol diamine, and mixtures thereof. In some embodiments, the sacrificial agent includes dodecyldimethylamine. In some embodiments, the sacrificial agent includes one or more compounds selected from N-oleyl-1,1'-iminobis-2-propanol and N-tallowalkyl-1,1'-iminobis-2-propanol. In some embodiments, the sacrificial agent includes a polyetheramine Generally, the amount of sacrificial agent can vary between about 0.005% to 1% by weight based on the dry stucco weight. As noted above, the sacrificial agent can be added directly to the stucco slurry or can be added to the dry stucco before water is added. While the sacrificial agent usually is added to the stucco or stucco slurry before the addition of other conventional additives, e.g., a dispersant or a foam generating agent, the broad aspects of the invention contemplate adding the sacrificial agent anytime up to the discharge of the stucco slurry from the slurry mixer. Depending on the level of anticipated (or measured) gypsum contaminants, the sacrificial agent(s) usually is present in an amount of 0.01 to 0.5%, or 0.02 to 0.2%, or 0.03-0.5% (all by percent by weight) based on the dry stucco weight. For example for each 1000 pounds of dry stucco, somewhere between 0.05 and 10 pounds of sacrificial agent would be used to provide between 0.005-1% by weight of sacrificial agent based on the dry stucco weight. For most gypsum sources, it is believed that an amount of sacrificial agent in the range of about 0.05 to about 0.5 wt. % should be satisfactory. When using an amine sacrificial agent for the expected/typical amount of contaminants in a source of gypsum, an application level of about 0.01 to about 0.1% (all percent by weight) based on the dry stucco weight, should be satisfactory. When using an ethoxylated alcohol sacrificial agent for the expected/typical amount of contaminants in a source of gypsum, an application level of about 0.05 to about 0.3% (all percent by weight) based on the dry stucco weight, should be satisfactory.

As noted, stucco may include a variety of contaminants, such as clays (e.g., smectite, illite, kaolin and chlorite clays, and the like), fly ash carbon and the like. Such contaminants may limit the effectiveness of the one or more commonly used stucco additives. In some embodiments, sacrificial agents are added to the gypsum slurry to mitigate against the negative impact of these contaminants. Again, the sacrificial agents may be added to the stucco, prior to mixing with water, or may be added directly to the stucco during the mixing process. It is expected that the sacrificial agents will be most effective if added to the stucco before the water reducing agents or dispersants and foam generating surfactants (soap) are added to the stucco slurry.

In accordance with the present invention, the manner in which the sacrificial agent and stucco are brought together is not critical. For example, the stucco and sacrificial agent may be mixed/stirred together or ground together before introduction into the stucco slurry mixer, the stucco may be sprayed with an aqueous mixture of a sacrificial agent, or some portion of the stucco may be coated by any suitable technique with the sacrificial agent. The manner of compounding a sacrificial agent with the stucco is not narrowly critical. The selection of a suitable technique and suitable conditions for compounding will be well within the bounds of routine testing for those skilled in the art.

As noted above, in addition to pre-contacting the stucco with a sacrificial agent, the sacrificial agent can alternatively be added directly to the stucco slurry in the mixer. The sacrificial agent can be added separately to the mixer as a dry ingredient, or in combination with any one or more of the liquid streams added to the mixer. Again, there is wide latitude in the way the sacrificial agent is introduced into the stucco slurry.

The stucco usually is present in the slurry in an amount of at least 50% by weight of the dry materials used to make the core of the gypsum wallboard. Normally, the amount of stucco is at least 80% by weight of the dry materials and often in many wallboard formulations the dry component material is more than 90% or even 95% by weight stucco. The method by which the gypsum source is calcined to produce stucco used in connection with the present invention is not critical, and methods yielding either alpha or beta-calcined stucco are suitable. Usually, beta gypsum hemihydrate is used as the source of stucco as that is the most common raw material for producing gypsum wallboard. The presence of some soluble calcium sulfate anhydrite in the stucco is also contemplated, although its presence is generally sought to be limited. The presence of insoluble anhydrate, as usual, is to be avoided if at all possible.

When forming the stucco slurry, excess water is added to the stucco in the mixer to create a flowable stucco slurry. The added water is in excess of that needed to hydrate the stucco (e.g., to form dehydrate gypsum crystals). The excess water does not chemically combine with the calcined gypsum (stucco) to form gypsum crystals, but instead the water molecules are located between gypsum crystals. As the set gypsum core of the panels is dried, the excess water evaporates and may leave empty spaces between the gypsum crystals. In some instances, these resulting voids and capillaries in the gypsum core may have a direct and negative influence on the core strength of the gypsum wallboard. It is generally understood that by reducing the amount of water added to the slurry (e.g., to approach only adding enough to hydrate the gypsum), the structural properties of the wallboard may be improved. Additionally, by reducing the amount of water added to the slurry the time and/or temperature required for drying the panels may be reduced.

In typical embodiments of the present invention, the viscosity of the liquid slurry is reduced by adding water reducing agents or dispersants to the stucco slurry. Suitable water reducing agents or dispersants may include a lignosulfonate product (e.g, calcium lignosulfonate, and similar bi-products obtained from paper manufacturing, and the like). In other embodiments, the water reducing agent or dispersant can be a polynaphthalene sulfonate (e.g., polynaphthalene sulfonate-formaldehyde condensate salts, and the like), a polymelamine sulfonate (e.g., polymelamine sulfonate-formaldehyde salts, and the like), or a polycarboxylate. As recognized by those skilled in the gypsum wallboard art, suitable polycarboxylates are copolymers composed of various constituents, such as acrylic or methacrylic backbones with attached pendant chains based on ethylene oxide or propylene oxide. There is no criticality in the nature of the specific dispersant employed for reducing the water demand of the stucco and the present invention can be used as a way of increasing the effectiveness of any dispersant that is adversely impacted by the presence of gypsum contaminants. Those skilled in the art of gypsum wallboard manufacture are aware of the wide range of suitable stucco dispersants. According to various embodiments, a stucco dispersant or water-reducing agent usually is added to the stucco slurry in an amount of from about 0.25 to about 0.5 wt. % based on the weight of stucco.

In some embodiments, it also may be advantageous to use a combination of more than one water reducing agent or dispersant to provide increased fluidity to the stucco slurry, while minimizing the amount of excess water to be added. In certain aspects, different water reducing agents or dispersants may function by different mechanisms, e.g., some function by adsorbing onto the surface of the gypsum crystals and encouraging particle dispersion by electrostatic repulsion, while others function by adsorbing onto the surface of the gypsum crystals and encouraging particle dispersion by steric interference. Thus, by using a combination of water reducing agents or dispersants a steric interference mechanism of dispersion may be effectively combined with the surface charge-repulsion phenomena of other water reducing agents or dispersants to have a synergistic effect on reducing stucco water demand.

In some embodiments, a foaming agent (air entraining agent) or soap (e.g., one or more surfactants) also may be added to the stucco slurry. The foaming agent is added to reduce the density of the set gypsum core of the wallboard by introducing voids in the set gypsum structure. The presence of such voids results in lower weight gypsum wallboard product. In some instances, the foaming agent may be in various forms, including a liquid, flake, and/or powdered form. The foaming agent may be added to the gypsum slurry to generate a foam that imparts a plurality of bubbles in the slurry during formation of a reaction product, as understood in the art. In some aspects, the foaming agent may be used to prepare a pre-generated aqueous mixture of soaps/surfactants. The foaming agent alternatively may be combined with a coalescing agent. In certain aspects, the foaming agent may comprise an anionic surfactant, a cationic surfactant, a nonionic surfactant, and the like. The foaming agent may include one or more surfactants. A suitable surfactant solution may comprise 30% to 60% of the active foaming agent. A variety of foams (soaps) are commercially available. Exemplary air-entraining agents that are commercially available include, but are not limited to, the HYONIC® line of soaps from GEO Specialty Chemicals, Ambler, Pa., and CEDEPAL FA-406, an ammonium alkyl ether sulfate available from Stepan, Northfield., Ill.

According to various embodiments, an air-entraining agent or soap is added to the stucco slurry in an amount from about 0.1 to about 0.4 wt. % based on the weight of stucco. For example, in a typical wallboard manufacturing facility, foam is generated separately by combining the soap, possibly a suitable dispersant and water. The foam can then be mixed with the stucco slurry. For example, it can be injected into the moving stucco slurry after it exits from the mixer through a hose or chute. The method of mixing foam with the stucco slurry is not an essential feature of the present invention. In some embodiments, the foaming agent may include an unstable foaming agent (e.g., an alkylsulfate compound). In some aspects, the gypsum slurry includes more than one foaming agent. The foaming agent may be used to generate foam by a number of conventional foam generating methods.

In further embodiments, still other ingredients may be used in minor amounts in the stucco slurry formulation. For example, glass fibers may be optionally added to the stucco slurry in amounts of up to 11 pounds per 1000 square feet of board (54 g/m$^2$). Also, up to 15 pounds per 1000 square feet of board (73.2 g/m$^2$) of paper fibers may be added to the stucco slurry. In some embodiments, a wax emulsion may also be added to the gypsum slurry in amounts of not more than 90 pounds per 1000 square feet of board (0.439 kg/m$^2$), or more often a silicone oil is added in small amounts to improve the water-resistance of the gypsum wallboard. In still other embodiments, other additives may also be added to the stucco slurry as are typical for any particular application. For example, a set retarder (usually in an amount of up to about 2 pounds per 1000 square feet of board (9.8 g/m$^2$)) or an accelerator (usually in an amount of up to about 35 pounds per 1000 square feet of board (170 g/m$^2$)) can be added to modify the rate at which the stucco hydration reactions take place. Exemplary accelerators include, but are not limited to, calcium sulfate, potassium sulfate, ball mill accelerator, and combinations thereof.

In the manufacture of wallboard in accordance with various embodiments of the present invention, a stucco slurry is prepared by combining dry stucco, water, one or more sacrificial agents, a foaming agent, a dispersant, and any other suitable additive(s). In one embodiment the sacrificial agent is added to the stucco slurry. In another embodiment, the sacrificial agent is added to the dry stucco. The sacrificial agent is added in an amount necessary to neutralize, at least in part, the detrimental effects of the gypsum contaminants. Usually, the sacrificial agent is added in an amount in excess of the amount needed to neutralize the detrimental effects of the maximum expected quantity of gypsum contaminants. Adding a substantial excess of the sacrificial agent over the amount needed to neutralize the gypsum contaminants does not adversely affect performance of the stucco slurry, but generally should be avoided for economic efficiency.

In operation, the dry stucco is fed into a slurry mixer, commonly referred to as a "pin" mixer because of the usual design, along with water. Prior to entry into the mixer, other dry additives, such as starch, or set accelerators, can be added to the powdered stucco. Still other additives are usually added directly to the mixer via one or more separate lines. Some additives, such as the stucco dispersant and the sacrificial agent, may also be added directly to the mixing water before the water is added into the mixer. This alternative is particularly convenient where the additives are in liquid form. For most additives, there is no criticality involved in the manner in which the additives are introduced into the stucco slurry, and they may be added using whatever equipment or method is convenient as understood by those skill in the wallboard manufacturing art. In one embodiment, the sacrificial agent may be added to mixer with the stucco and water before any additional additives are added to the stucco slurry. A water reducing dispersant may then be added to the stucco slurry. In certain embodiments, a foaming agent may be added to the stucco slurry before or after the water reducing dispersants are added to the gypsum slurry. The foaming agent may be added directly to the mixer, resulting in the generation of foam in situ. Additionally or alternatively, the foaming agent may be used to generate foam externally of the stucco slurry that is then added to the slurry at the gate or in the mixture just prior to applying the stucco slurry to a cover sheet.

In some aspects, the stucco slurry is deposited onto a first cover sheet. The slurry may be dispersed on the cover sheet to have a predefined thickness. In some aspects, the thickness of the wallboard is less than 1 inch, or in other aspects is from about ¼ inch to about ⅝ inch. In some embodiments, a second cover sheet is applied to the gypsum layer (e.g., to sandwich the gypsum layer between the first and second cover sheets). The cover sheets(s) may be folded to enclose the edges of the gypsum layer. In some aspects, the cover sheets are formed from one or more materials, including paper fibers or glass fibers. In some aspects, the first cover sheet is formed of a different material than the second cover sheet. In alternative aspects, the first cover sheet and the second cover sheet are formed of the same material(s). In some aspects, the cover sheets are formed to include one or more additives (which may provide, e.g., fire retarding properties, mildew retarding properties, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure.

What is claimed is:

1. A method for preparing a stucco slurry suitable for manufacturing gypsum wallboard comprising:
   combining water with stucco and a sacrificial agent to form a mixture, wherein the stucco comprises a clay contaminant, and wherein the sacrificial agent:
   (a) is selected from an alcohol ethoxylate, an amine, or a combination thereof; or
   (b) has a hydrophilic-lipophilic balance of 5 to 20; and
   combining the mixture with a foaming agent comprising a surfactant or a soap to yield the stucco slurry;
   wherein the sacrificial agent neutralizes the clay contaminant to prevent the clay contaminant from adsorbing the foaming agent.

2. The method of claim 1, wherein the sacrificial agent constitutes a hydrotrope.

3. The method of claim 1, wherein the sacrificial agent comprises poly(oxy-1,2-ethanediyl), α-(2-ethylhexyl)-ω-hydroxy.

4. The method of claim 1, wherein the sacrificial agent comprises an amine compound having the chemical structure NR1R2R3, wherein
   R1 is selected from substituted or unsubstituted non-alkoxylated $C_{5-22}$ alkyls, substituted or unsubstituted non-alkoxylated $C_{5-22}$ alkenyls, substituted or unsubstituted non-alkoxylated $C_{5-22}$ alkynyls, substituted or unsubstituted $C_{2-22}$ alkoxylated alkyls, substituted or unsubstituted $C_{2-22}$ alkoxylated alkenyls, and substituted or unsubstituted $C_{2-22}$ alkoxylated alkynyls,
   R2 and R3 are non-alkoxylated and are independently selected from hydrogen, substituted or unsubstituted $C_{1-22}$ alkyls, substituted or unsubstituted $C_{2-22}$ alkenyls, and substituted or unsubstituted $C_{2-22}$ alkynyls.

5. The method of claim 4 wherein the amine compound is selected from the group consisting of tridodecylamine, dodecyldimethylamine, octadecyldimethylamine, cocoalkyldimethylamine, hydrogenated tallowalkyldimethylamines, oleyldimethylamine, dicocoalkylmethylamine, N-oleyl-1,1'-iminobis-2-propanol, N-tallowalkyl-1,1'-iminobis-2-propanol, polyoxypropylenediamine, triethyleneglycol diamine, and mixtures thereof.

6. The method of claim 1, wherein the stucco slurry comprises one or more additives selected from dispersants, starch, accelerators, fibers, polymers, plasticizers, fire retarders, mildew retarders, thickeners, coalescing agents, and combinations thereof.

7. The method of claim 1, wherein combining the water with the stucco and the sacrificial agent to form a mixture comprises combining the sacrificial agent with the stucco, wherein the stucco is dry; and then adding the water to the combined stucco and sacrificial agent.

8. The method of claim 7, wherein the sacrificial agent is a dry ingredient combined with the stucco.

9. The method of claim 1, wherein the stucco slurry comprises about 0.05% to about 0.5% of the sacrificial agent by weight, and about 0.1% to about 0.4% of the foaming agent by weight, based on the dry stucco weight.

10. A stucco slurry comprising water, stucco, a sacrificial agent, a dispersant, and a foaming agent;
wherein the dispersant has a different chemical composition than the foaming agent; and
wherein the sacrificial agent comprises:
(i) poly(oxy-1,2-ethanediyl), α-(2-ethylhexyl)-ω-hydroxy; or
(ii) an amine compound having the chemical structure NR1R2R3, wherein:
R1 is selected from substituted or unsubstituted non-alkoxylated $C_{5-22}$ alkyls, substituted or unsubstituted non-alkoxylated $C_{5-22}$ alkenyls, substituted or unsubstituted non-alkoxylated $C_{5-22}$ alkynyls, substituted or unsubstituted $C_{2-22}$ alkoxylated alkyls, substituted or unsubstituted $C_{2-22}$ alkoxylated alkenyls, and substituted or unsubstituted $C_{2-22}$ alkoxylated alkynyls; and
R2 and R3 are non-alkoxylated and are independently selected from hydrogen, substituted or unsubstituted $C_{1-22}$ alkyls, substituted or unsubstituted $C_{2-22}$ alkenyls, and substituted or unsubstituted $C_{2-22}$ alkynyls; and wherein
the amine compound is selected from the group consisting of tridodecylamine, dodecyldimethylamine, octadecyldimethylamine, cocoalkyldimethylamine, hydrogenated tallowalkyldimethylamines, oleyldimethylamine, dicocoalkylmethylamine, N-oleyl-1,1'-iminobis-2-propanol, N-tallowalkyl-1,1'-iminobis-2-propanol, polyoxypropylenediamine, triethyleneglycol diamine, and mixtures thereof.

11. The stucco slurry of claim 10, wherein the sacrificial agent constitutes a hydrotrope.

12. The stucco slurry of claim 10, wherein the stucco slurry comprises one or more additives selected from starch, accelerators, fibers, polymers, plasticizers, fire retarders, mildew retarders, thickeners, coalescing agents, and combinations thereof.

13. The stucco slurry of claim 10, wherein the stucco slurry comprises, by weight, based on the dry stucco weight:
about 0.25% to about 0.5% of the dispersant; and
about 0.1% to about 0.4% of the foaming agent.

14. A composition of stucco and a sacrificial agent, wherein the sacrificial agent comprises:
(i) poly(oxy-1,2-ethanediyl), α-(2-ethylhexyl)-ω-hydroxy; or
(ii) an amine compound having the chemical structure NR1R2R3, wherein:
R1 is selected from substituted or unsubstituted non-alkoxylated $C_{5-22}$ alkyls, substituted or unsubstituted non-alkoxylated $C_{5-22}$ alkenyls, substituted or unsubstituted non-alkoxylated $C_{5-22}$ alkynyls, substituted or unsubstituted $C_{2-22}$ alkoxylated alkyls, substituted or unsubstituted $C_{2-22}$ alkoxylated alkenyls, and substituted or unsubstituted $C_{2-22}$ alkoxylated alkynyls; and
R2 and R3 are non-alkoxylated and are independently selected from hydrogen, substituted or unsubstituted $C_{1-22}$ alkyls, substituted or unsubstituted $C_{2-22}$ alkenyls, and substituted or unsubstituted $C_{2-22}$ alkynyls; and wherein
the amine compound is selected from the group consisting of tridodecylamine, dodecyldimethylamine, octadecyldimethylamine, cocoalkyldimethylamine, hydrogenated tallowalkyldimethylamines, oleyldimethylamine, dicocoalkylmethylamine, N-oleyl-1,1'-iminobis-2-propanol, N-tallowalkyl-1,1'-iminobis-2-propanol, polyoxypropylenediamine, triethyleneglycol diamine, and mixtures thereof.

15. The composition of claim 14 wherein the sacrificial agent constitutes a hydrotrope.

16. The composition of claim 14, wherein the composition further comprises about 0.25% to about 0.5% of a dispersant by weight, based on the dry stucco weight.

17. The composition of claim 14, wherein the composition further comprises about 0.1% to about 0.4% of a foaming agent by weight, based on the dry stucco weight.

18. A method of making a gypsum wallboard comprising:
preparing a stucco slurry by combining water, stucco, a sacrificial agent, a dispersant, and a foaming agent, wherein the stucco comprises a clay contaminant, wherein the sacrificial agent is selected from an alcohol ethoxylate, an amine, or a combination thereof, and wherein the stucco is combined with the sacrificial agent before the stucco is combined with the dispersant and the foaming agent; and
allowing the stucco slurry to set between two substantially parallel cover sheets to form the gypsum wallboard;
wherein the dispersant has a different chemical composition than the foaming agent; and
wherein the sacrificial agent neutralizes the clay contaminant to prevent the clay contaminant from adsorbing the foaming agent.

19. The method of claim 18, wherein the sacrificial agent constitutes a hydrotrope.

20. The method of claim 18, wherein the alcohol ethoxylate comprises poly(oxy-1,2-ethanediyl), α-(2-ethylhexyl)-ω-hydroxy.

21. The method of claim 20 wherein the amine comprises a compound having the chemical structure NR1R2R3, wherein
R1 is selected from substituted or unsubstituted non-alkoxylated $C_{5-22}$ alkyls, substituted or unsubstituted non-alkoxylated $C_{5-22}$ alkenyls, substituted or unsubstituted non-alkoxylated $C_{5-22}$ alkynyls, substituted or unsubstituted $C_{2-22}$ alkoxylated alkyls, substituted or unsubstituted $C_{2-22}$ alkoxylated alkenyls, and substituted or unsubstituted $C_{2-22}$ alkoxylated alkynyls,
R2 and R3 are non-alkoxylated and are independently selected from hydrogen, substituted or unsubstituted $C_{1-22}$ alkyls, substituted or unsubstituted $C_{2-22}$ alkenyls, and substituted or unsubstituted $C_{2-22}$ alkynyls.

22. The method of claim 21 wherein the amine compound is selected from the group consisting of tridodecylamine, dodecyldimethylamine, octadecyldimethylamine, cocoalkyldimethylamine, hydrogenated tallowalkyldimethylamines, oleyldimethylamine, dicocoalkylmethylamine, N-oleyl-1,1'-iminobis-2-propanol, N-tallowalkyl-1,1'-iminobis-2-propanol, polyoxypropylenediamine, triethyleneglycol diamine, and mixtures thereof.

23. The method of claim 18, wherein the stucco slurry comprises one or more additives selected from starch, accelerators, fibers, polymers, plasticizers, fire retarders, mildew retarders, thickeners, coalescing agents, and combinations thereof.

24. The method of claim 18, wherein preparing the stucco slurry comprises:
preparing a dry mixture by combining the stucco with the sacrificial agent;
preparing a foam by combining the water with the foaming agent and the dispersant; and
combining the dry mixture with the foam.

25. A gypsum wallboard made by the method of claim 18.

* * * * *